United States Patent [19]
Decker

[11] Patent Number: 5,380,204
[45] Date of Patent: Jan. 10, 1995

[54] NIGHT VISION GOGGLE AIDED FLIGHT SIMULATION SYSTEM AND METHOD

[75] Inventor: William M. Decker, Roanoke, Va.

[73] Assignee: The United States of America as represented by the Secretary of the Army, Washington, D.C.

[21] Appl. No.: 98,988

[22] Filed: Jul. 29, 1993

[51] Int. Cl.⁶ .............................. G09B 9/36
[52] U.S. Cl. ........................ 434/36; 434/41; 434/43; 345/8; 348/217; 359/630; 364/578
[58] Field of Search ............. 434/16, 17, 20, 21, 434/29, 30, 36, 38, 41, 43, 44, 307; 348/216, 217; 364/571.02; 362/62; 345/8, 199, 7; 359/630, 815; 250/214 VT, 227.11, 330

[56] References Cited

U.S. PATENT DOCUMENTS

| | | | |
|---|---|---|---|
| 3,818,198 | 6/1974 | Walker et al. | 364/526 |
| 4,000,419 | 12/1976 | Grost et al. | 250/214 VT |
| 4,068,922 | 1/1978 | Dotsko | 359/477 X |
| 4,580,196 | 4/1986 | Task | 362/62 |
| 4,641,255 | 2/1987 | Hohmann | 434/43 X |
| 4,645,459 | 2/1987 | Graf et al. | 434/43 |
| 4,714,428 | 12/1987 | Bunker et al. | 434/43 |
| 4,943,938 | 7/1990 | Aoshima et al. | 345/199 X |
| 5,113,177 | 5/1992 | Cohen | 345/8 |
| 5,194,008 | 3/1993 | Mohan et al. | 434/20 X |
| 5,268,570 | 12/1993 | Kim | 250/214 VT |

OTHER PUBLICATIONS

"Predicting the performance of Night Vision Devices using a simple contrast Model" by Major William M. Decker IV; Helmet-Mounted Display, SPIE vol. 1116, 1989, pp. 162–169.

*Primary Examiner*—Stephen R. Crow
*Assistant Examiner*—Joe H. Cheng
*Attorney, Agent, or Firm*—Milton W. Lee; Alain L. Bashore; Anthony T. Lane

[57] ABSTRACT

A night vision goggle aided flight simulation system and technique allows an flight simulator operator wearing night vision goggles to view an approximate simulation of night vision goggle aided flight. A processor generates at least one look-up table of brightness values utilizing database sources including any selected options. A scene generation computer will then generate the scene image with the contrast based on values provided by the look-up table. An image display system displays the scene at light levels with sufficient dynamic range so that approximate simulation of night vision goggle aided flight is achieved. A neutral density filter can be placed over a CRT display if the CRT display as the display system cannot produce sufficient dynamic range.

6 Claims, 4 Drawing Sheets

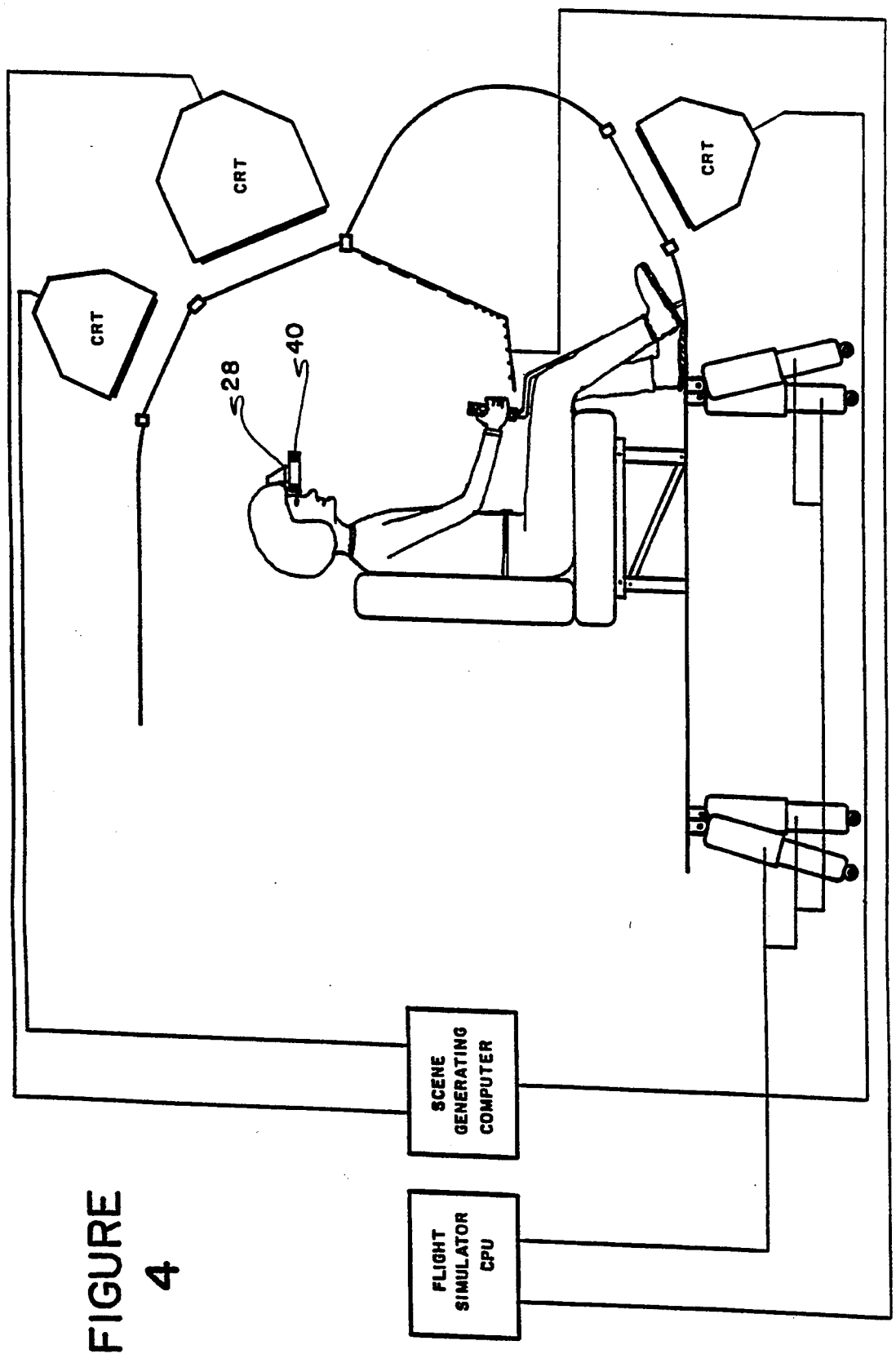

NIGHT VISION GOGGLE AIDED FLIGHT SIMULATION SYSTEM AND METHOD

BACKGROUND OF THE INVENTION

1. Field of the Invention

The present invention generally relates to aircraft simulation apparatus and techniques and more specifically, to night vision goggle aided flight simulation.

2. Description of Prior Art

Flight simulation allows for the evaluation of increasingly complex systems utilized in aircraft for the purposes of testing and flight training. Simulation may yield evaluation of systems while they are still in the design stage to allow optimization of the design process. Aviator training performance can be enhanced and evaluated for many types of flight situations without the cost or danger of real situations. The current generation of aircraft simulators utilize computerization where realism is provided with cockpit representation (on either a fixed or moving platform), functioning instruments, and visual displays. One type of aircraft simulation which has yet to be adequately simulated is night vision goggle aided flight.

Pilot's night vision goggles are now utilized in sophisticated aircraft environments, such as the Army's Blackhawk and high performance Navy and Air Force aircraft cockpits. This has led to an increasing need for night vision goggle aided flight training, but without associated dangers. Helicopter pilots have reported "disappearances" of roads through green pastures when viewed through night vision enhancement devices. Due to the limitations of the simulators in use today, pilots only encounter such phenomena in actual field training environment. The risk associated with night vision goggle training, where mistakes in perception may have fatal consequences, make the use of aircraft simulators that provide training highly desirable as a substitute for night training flights. While the prior art has reported using night flight simulation none have established a basis for a specific system that is dedicated to the task of resolving the particular problem at hand.

The nighttime conditions presented in the simulator to an aviator wearing night vision goggles are not accurate renditions of what the aviator would see in conducting an actual night flight. The spectral response of the pilots's eyes are significantly different from either the second or third generation goggle's spectral response. Many flight simulator displays do not have the dynamic range necessary to produce a display of the required low radiance. The standard flight simulator display consists of an array of cathode ray tubes (CRTs). These displays must simulate illumination conditions from bright sunlight down to overcast starlight. The dynamic range required is approximately ten orders of magnitude. The simulation of scenes at night is further complicated as to simulate flights around urban or suburban areas such that the displays must accurately display point sources of light. Current Army night vision goggles are filtered so as to not be responsive to blue or green light such that a use of these colors in a normal display is not effective. Current simulation technology results in imagery that is realistic when viewed by the naked eye, but not realistic when viewed through night vision goggles. The restrictive nature of the night vision goggles also require their actual use in the cockpit simulator for effective training.

What is needed in this instance is an apparatus and technique that will allow pilots to use night vision goggles with the current generation of flight simulators so as to gain proficiency with night vision goggles safely.

SUMMARY OF THE INVENTION

It is therefore the object of the invention to provide an system and technique for night vision goggle aided flight simulation.

According to the invention, a night vision goggle aided flight simulation technique and system utilizes database sources so that a flight simulator operator viewing a simulator generated scene with night vision goggles simulation of night vision goggle aided flight. Database sources include: goggle, illumination source, background, targets, relative humidity, range to the most distant target, filters, and windscreens. These sources may also be selected options chosen by the user. At least one look-up table is generated based on the input variables which is utilized for the scene generation contrast. The contrasted scene is then displayed by a display system with sufficient intrascene dynamic range so that an approximate simulation of night vision goggle aided flight is achieved. If the display system is a cathode ray tube (CRT) display which cannot produce sufficient intrascene dynamic range, a neutral density filter may be placed over the CRT display or over the night vision goggle lens.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a pictorial view of the flight simulator shown in FIG. 2 in a second alternative preferred embodiment utilizing filters placed over night vision goggles.

DETAILED DESCRIPTION OF A PREFERRED EMBODIMENT OF THE INVENTION

Figure 1:
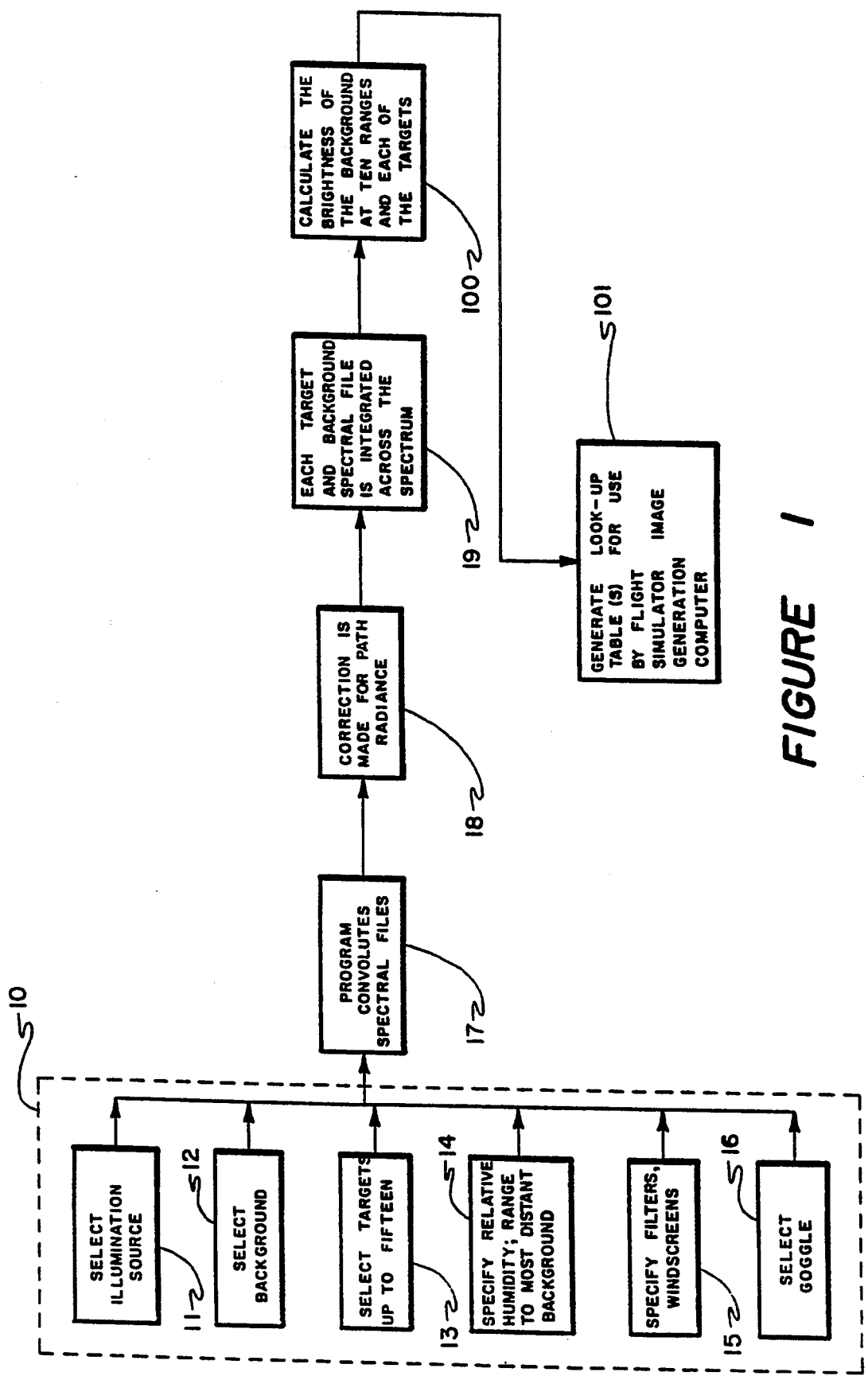
FIG. 1 is a generalized flow chart of the image intensifier contrast program model utilized to calculate light levels.

Referring now to the drawings, and more particularly to FIG. 1, there is shown a generalized flow chart of an image intensifier contrast model which calculates the monochromatic contrast between a target and background utilized to calculate light levels. A series of inputs 10 derived from database sources are initially made to the computer processor utilizing the contrast model. Inputs parameters 10 include selection options 11 through 16 from data base sources which include respectively the selection of: illumination source, background, up to fifteen targets within a field of view, relative humidity, the range to the most distant background, filters and windscreens to be utilized, and the type of night vision goggle to be used. The atmospheric attenuation coefficients utilized in the instant model were generated by "LOWTRAN IV" for a 20 degree celsius day in a temperate climate. The filters and windscreens selection options in step 15 includes visors, heads-up displays or any other transmissive element that a viewer may select. The user may select any or all or none of the above described selection options. Inputs that are not selected would be pre-selected as default parameters.

The procedure necessary to convolute the spectral files of step 17 is as follows. The monochromatic contrast is calculated by taking the difference between the integrated target and background intensities, and dividing by the background intensity which is then multiplied by 100 to get a percentage. Data on reflectivities utilized for the targets selected were measured on a Perkin Elmer "LAMBDA 9 SPECTROPHOTOMETER". All surfaces are assumed lambertian, and there is no calculation of specular reflections, such as calculations of the light specularly reflected by an object from a point ( e.g. the moon). The atmospheric transmission is calculated from the attenuation coefficients, which then calculates the total light through the system. The total light is then convoluted with the spectral response of the night vision goggle.

Spectral response curve data is based on response measured for night vision enhancement devices, which, in the preferred, embodiment is for night vision goggles. The variation in the response of production photocathodes is large, with some image intensifier tubes barely meeting minimum specifications while others exceeding specification by 50% or more. Data curves for the ANVIS 625 and ANVIS 665 were made by taking a 1200 microamperes per lumen photocathode and convoluting it with the transmission curve for a cockpit lighting filter (625 nm and 665 respectively).

These spectral files are convoluted with one another, with a product of illumination, reflectivity, atmospheric transmission, filter transmission, and sensor responsitivity calculated at 10 nm intervals. These products are then summed across the spectrum to determine an integrated brightness for that particular object. The contrast model makes a correction for path radiance in step 18. The user can choose the path radiance factor utilized in step 18 such that there is proper compensation based upon whether the airborne particulate are scatterers or absorbers. Each target and background spectral file is integrated across the spectrum of 400 to 2000 nm in the preferred embodiment of 10 nm intervals in step 19. The procedure is repeated for each target and the background at ten different ranges in step 100 to generate the look-up table(s) used by the scene generation computer in step 101.

The technique described above uses the light level to be simulated, and accounting for the spectral response of night vision goggles, calculates a relative intensity the object being simulated should be displayed at. This is referenced to the intensity of light reflected from what the user has chosen for the background under the same lighting conditions, so that a display system can accurately display the same contrast as the pilot would see during actual night flights. A further description of the contrast model utilized in the preferred embodiment is found in: "Predicting the performance of Night Vision Devices using a simple contrast model" by Major William M. Decker IV; Helmet-Mounted Displays, Jerome T. Carollo, Editor; Proc. SPIE 1116; pages 162-169 (1989).

Figure 2:
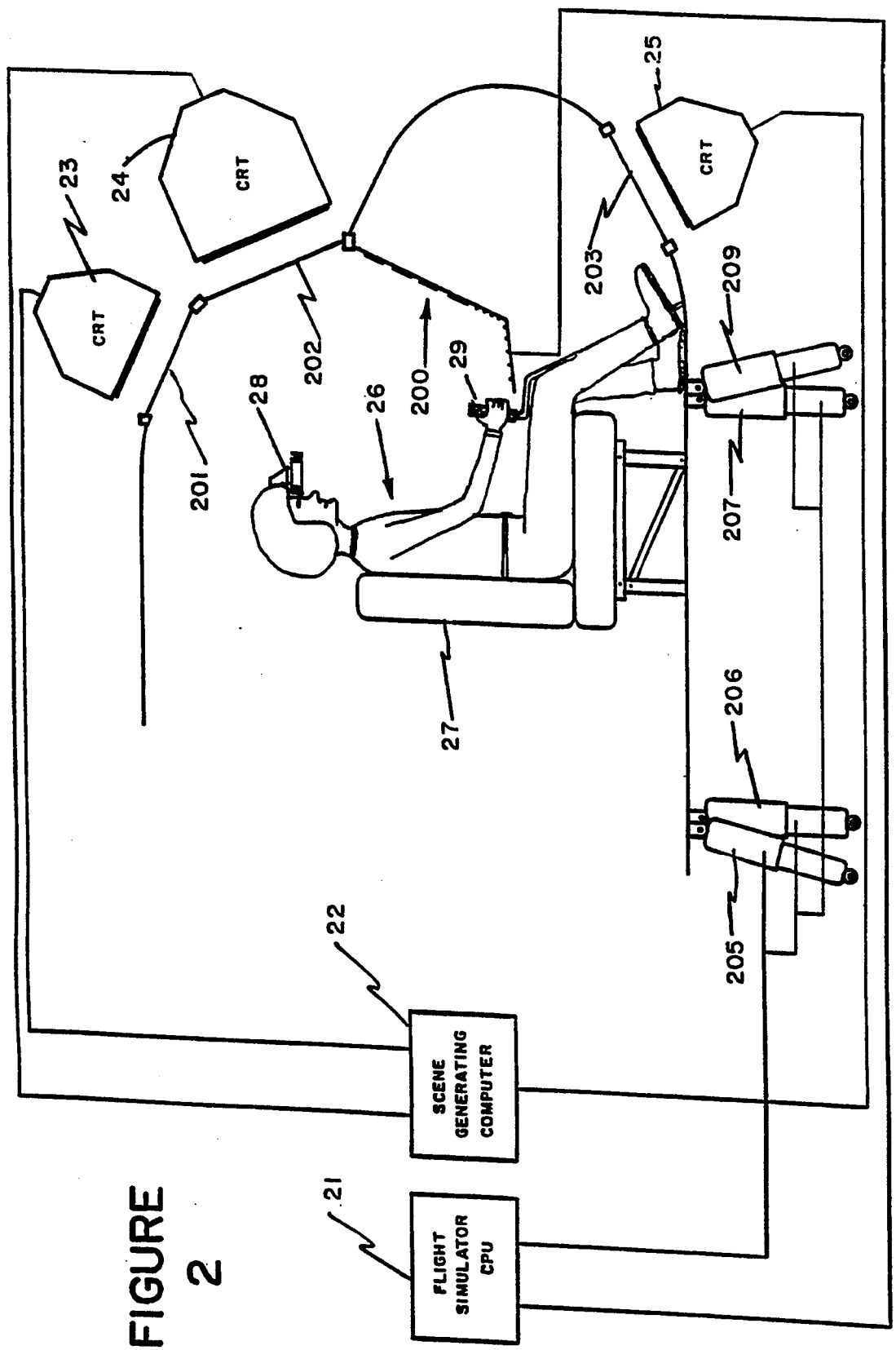
FIG. 2 is a pictorial view of a flight simulator and its display system utilized in the preferred embodiment.

FIG. 2 is a pictorial view of a flight simulator and its display system utilized in the preferred embodiment. Flight simulator CPU 21 generates the look-up table shown as step 101 of FIG. 1 which determines the contrast of the imagery displayed. It is understood that while the preferred embodiment shows the contrast program model of FIG. 1 being manipulated within the Flight simulator CPU 21 of FIG. 2, a separate microcomputer may also provide the look-up table. Scene generation computer 22 of FIG. 2 then utilizes the look-up table to generate imagery which is displayed by a display system which includes CRT displays 23, 24, and 25. It is understood that other display system may be utilized in the present invention, such as projection television displays. The light levels are thus generated by the display system in a simulator to provide realistic contrast among the many objects in the generalized scene. Simulator pilot 26 sits in cockpit seat 27 and wears night vision goggles 28 while operating controls 29 and viewing cockpit display 200 and scenes through windows 201, 202, 203. Input responses received by controls 29 from the pilot are digitized and input into CPU 21 which in turn is used by scene generation computer 22 for the appropriate output display on CRT's 23 through 25. Flight simulator CPU 21 would also control hydraulics 205 through 209 which would provide hydraulic action in three dimensions to cockpit seat 27.

The night vision goggles used to pilot military aircraft are responsive to light in the 625 nm to 920 nm band, which includes the red and near infrared portions of the spectrum. In order to provide imagery that appears realistic to the aviator using night vision goggles, it is not necessary to use a CRT emitting light throughout this spectrum. Any CRT emitting over part of this spectrum can be used to good effect, providing that the contrast among objects in the scene is proper and the intensity of light emitted by the CRT is equivalent in respect to the night vision goggle being used to that available in the field under the conditions being simulated. The technique utilizing the above described system is next described.

In practicing the above procedures, an instructor pilot would select a scenario and flight profile for use in the flight simulator mission run. Flight simulator CPU 21 would provide a list of all backgrounds and objects that will be displayed in the pilot's field of view. The lighting and weather conditions would be specified along with the type of night vision goggles. The type of aircraft and type of windscreen would also be specified. It would also be determined if the mission run required the pilot fly with laser protective filters.

The information provided above would be used as inputs to the contrast model of FIG. 1. Flight simulator CPU 21 of FIG. 2 would output a series of look-up tables derived by the contrast model that will serve as a reference for scene contrast to scene generation computer 22. Scene generation computer 22 will then generate the scene using the same spatial data that would be used for daytime flight simulation. The manner by which the scene generation computer generates a scene is not part of this invention, and may be generated by any of several techniques well known in the art. However, the brightness of the various objects in the field of view would be based upon the values provided in the appropriate look-up table or tables of step 101 in FIG. 1. As night vision goggles 28 of FIG. 2 do not provide a color display, a monochromatic scene would be generated and displayed on CRT displays 23, 24 and 25. Some CRT displays are incapable of generating scenes with average brightness equivalent to the average scene radiance of a starlit or moonlit scene, which require the use of a technique, such as those disclosed in the alternative embodiments of FIGS. 3 and 4.

Figure 3:
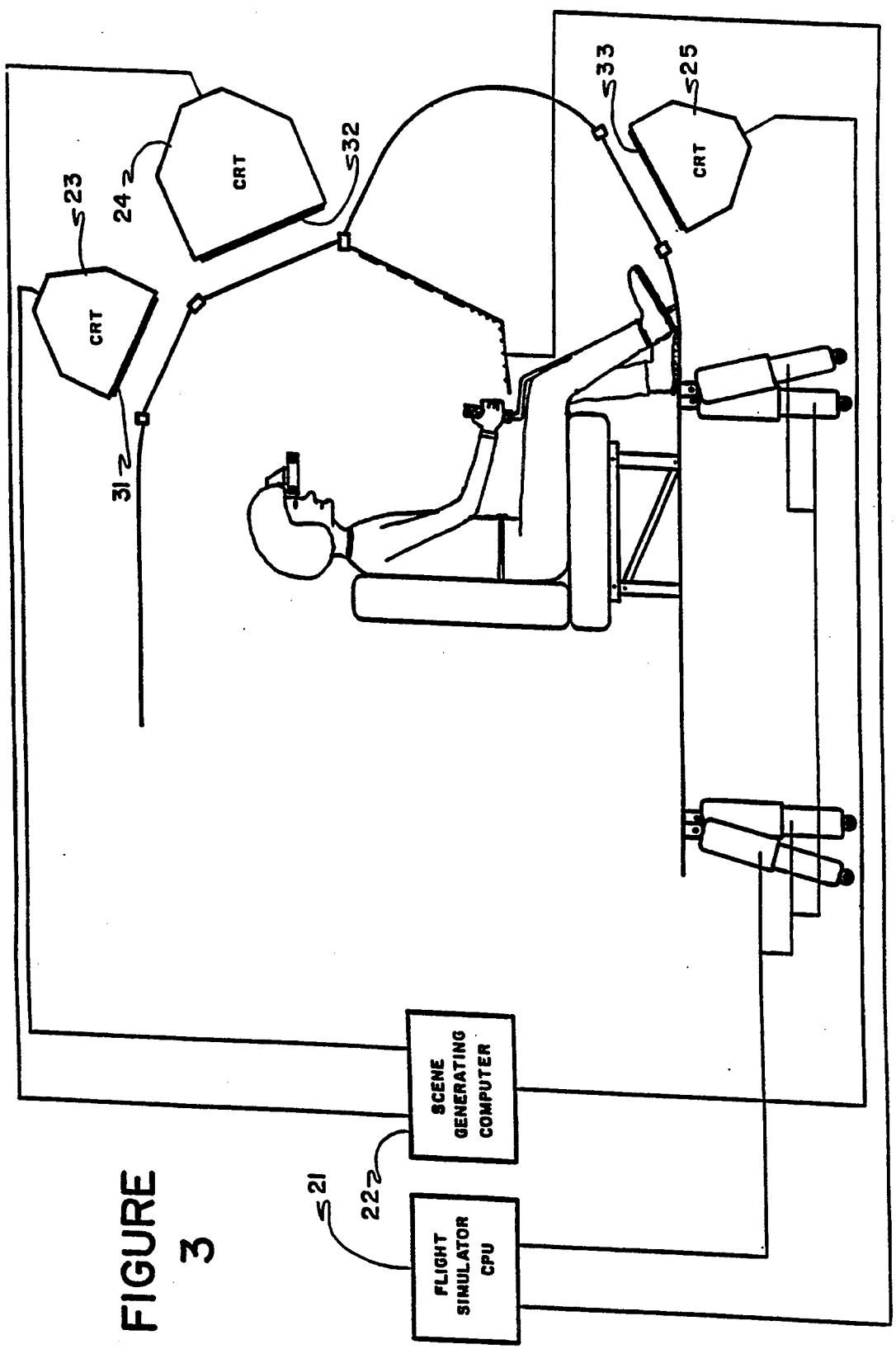
FIG. 3 is a pictorial view of the flight simulator shown in FIG. 2 in an alternative preferred embodiment utilizing a series of filters placed over the display system.

FIGS. 3 and 4 are pictorial views of the flight simulator in two alternative embodiments utilizing a series of filters placed over the display system or over the night vision goggle lens. The filters are used if the CRT is unable to generate the intrascene dynamic range required, which may be as much as six orders of magnitude. FIG. 3 shows neutral density filters 31, 32, and 33 attached over the display screens of CRT displays 23, 24, and 25 respectively so as to modify display output brightness. A CRT designed for a display output brightness range of 0.1 to 100 fL, would have to have its brightness modified to a range of $10 \times 10^{-6}$ to $10 \times 10^{-3}$. A neutral density filter of O.D.=5 would be then attached to the CRT display which would reduce the output brightness of the CRT by a factor of 100,000. A similar approach can be used with projection systems, with the neutral density filters placed over the projection lens. FIG. 4 shows the second alternative preferred embodiment utilizing neutral density filters 40 placed over night vision goggles 28. The appropriate filter density is determined similarly to that describing use of filters discussed in conjunction with FIG. 3.

The net effects of both alternative embodiments described in conjunction with FIGS. 3 and 4, concerning imagery as seen by the pilot are identical. The first alternative embodiment is more desirable, as the pilot would be presented with realistic scene light levels when he looked around the goggles. To look around the goggles is a normal procedure used to check instruments, and in some hover maneuvers, such that when the first alternative embodiment of FIG. 3 is utilized the user will receive a realistic view, but will not do so when utilizing the second alternative embodiment shown in FIG. 4. In both first and second alternative embodiments, a series of filters, from neutral density of 3 (attenuation by a factor of 1,000) to a neutral density of 6 (attenuation by a factor of 1,000,000) will be provided to allow the simulation of a wide range of nighttime lighting conditions.

For both alternative embodiments, the result is imagery that would be projected monochromatically, using just the red phosphor of the projection system which provides several results. Fewer and simpler calculations would be required of the scene generation computer. The display is matched to the night vision goggles which is not sensitive to green or blue. The night vision goggles are inherently monochromatic, so a monochromatic display is appropriate. By using the red portion of the spectrum where the human eye is less sensitive than in the green, the outside scene appears more realistic to the pilot looking around the night vision goggles.

While this invention has been described in terms of the preferred embodiment consisting of flight simulation, those skilled in the art will recognize that the invention can be practiced with modification within the spirit and scope of the appended claims.

Having thus described my invention, what I claim as new and desire to secure by Letters Patent is as follows:

1. A night vision goggle aided flight infrared simulation system for use with an operator viewing at least one infrared scene generated to be viewed through night vision goggles in a flight simulator including:
   a flight simulation selection means for determining any selected parameter options from at least one database source to be utilized;
   a processing means utilizing given parameters of at least one database including any selected parameter options for,
      convoluting spectral files from given parameters and any selected parameter options,
      correcting for path radiance for each convoluted spectral file,
      integrating each target and background spectral file across a given spectrum,
      calculating the brightness of the background at each range and each target,
      generating at least one look-up table of brightness values;
   a scene generating means for generating an infrared image of a scene to be displayed, whereby the contrast of the displayed image is based on values provided by the look-up table;
   an image display means for displaying at least one infrared scene generated by the scene generating means, whereby light levels are thus generated which provides intrascene dynamic range sufficient to be viewed with night vision goggles;
   a night vision goggle so that an operator viewing the infrared scene through the night vision goggles views a sufficiently realistic simulation of night vision goggle aided flight.

2. The night vision goggle aided flight simulation system of claim 1 wherein the image display means is a cathode ray tube (CRT) display.

3. The night vision goggle aided flight simulation system of claim 2 wherein the image display means further includes a neutral density filter placed over the CRT display.

4. The night vision goggle aided flight simulation system of claim 1 wherein the selected parameter options includes one or more of the following:
   illumination source, background up to fifteen targets within a field of view, relative humidity, range to most distant target, filters, windscreens, and type of night vision goggle to be used.

5. A night vision goggle aided flight infrared simulation method for use with an operator viewing at least one scene generated to be viewed through night vision goggles in a flight simulator comprising the steps of:
   providing given parameters and any selected parameter options necessary to generate a simulated infrared scene to be viewed;
   convoluting spectral files from given parameters and any selected parameter options;
   correcting for path radiance for each convoluted spectral file;
   integrating each target and background spectral file across a given spectrum;
   calculating the brightness of the background at each range and each target;
   generating at least one look-up table of brightness values based on the given parameters including any selected parameter options;
   generating an infrared scene whereby the contrast of the displayed infrared scene is based on values provided by the look-up table;
   displaying the contrasted scene whereby light levels are generated which provide intrascene dynamic range sufficient to be viewed with night vision goggles;
   viewing the infrared scene through the night vision goggles such that there is viewed a sufficiently realistic simulation of night vision goggle aided flight.

6. The night vision goggle aided flight simulation method of claim 5 wherein the selected parameter options include one or more of the following: illumination source, background up to fifteen targets within a field of view, relative humidity, range to most distant target, filters, windscreens, and type of night vision goggle to be used.

* * * * *